US 11,472,468 B2

(12) United States Patent
Tashiro et al.

(10) Patent No.: US 11,472,468 B2
(45) Date of Patent: Oct. 18, 2022

(54) POWER STEERING APPARATUS

(71) Applicant: HITACHI AUTOMOTIVE SYSTEMS, LTD., Hitachinaka (JP)

(72) Inventors: Ryo Tashiro, Novi, MI (US); Osamu Yoshida, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 756 days.

(21) Appl. No.: 16/477,134

(22) PCT Filed: Dec. 11, 2017

(86) PCT No.: PCT/JP2017/044315
§ 371 (c)(1),
(2) Date: Jul. 10, 2019

(87) PCT Pub. No.: WO2018/131358
PCT Pub. Date: Jul. 19, 2018

(65) Prior Publication Data
US 2019/0351938 A1    Nov. 21, 2019

(30) Foreign Application Priority Data
Jan. 11, 2017  (JP) ............................. JP2017-002880

(51) Int. Cl.
*B62D 5/04* (2006.01)
*F16H 25/22* (2006.01)
(Continued)

(52) U.S. Cl.
CPC ......... *B62D 5/0448* (2013.01); *B62D 5/0421* (2013.01); *F16H 25/2214* (2013.01); *F16H 55/36* (2013.01); *F16H 55/48* (2013.01)

(58) Field of Classification Search
CPC . B62D 5/0448; B62D 5/0421; F16H 25/2214; F16H 55/36; F16H 55/48
See application file for complete search history.

(56) References Cited

U.S. PATENT DOCUMENTS

2014/0260728 A1*  9/2014  Holm ................... F16C 35/063
                                              74/89.23
2015/0060188 A1*  3/2015  Kitamura ............. B62D 5/0448
                                              180/444

(Continued)

FOREIGN PATENT DOCUMENTS

JP        2014-184739 A      10/2014

OTHER PUBLICATIONS

International Search Report dated Feb. 27, 2018 in International Application No. PCT/JP2017/044315.

(Continued)

*Primary Examiner* — William C Joyce
*Assistant Examiner* — Gregory T Prather
(74) *Attorney, Agent, or Firm* — Foley & Lardner LLP

(57) ABSTRACT

Provided is a power steering apparatus capable of reducing a maximumly generated stress on an output pulley. An output pulley of a power steering apparatus includes a fastening target portion around a screw insertion hole of a hub portion. When a boundary portion between the hub portion and a winding and hanging portion is defined to be a portion where a minor angle, among relative angles formed between a tangential line of an inner surface of the output pulley and a rotational axis of a nut in an axial cross section of the output pulley that passes through the rotational axis of the nut, gradually reduces from a nut-rotational-axis side toward a radially outer side to then reach 45 degrees, the fastening target portion is a region that is located on an inner side in a radial direction with respect to the boundary portion and overlaps a head portion of a screw in a radial direction of the screw.

15 Claims, 9 Drawing Sheets

(51) Int. Cl.
*F16H 55/36* (2006.01)
*F16H 55/48* (2006.01)

(56) References Cited

U.S. PATENT DOCUMENTS

2016/0075368 A1* 3/2016 Watanabe ............ B62D 5/0424
                                                    180/444
2017/0030448 A1* 2/2017 Urban .................. B62D 5/0424
2018/0086365 A1* 3/2018 Lam ..................... B62D 5/0448
2019/0382047 A1* 12/2019 Yoshida ................ F16C 35/077
2020/0340561 A1* 10/2020 Kaneko ............... F16H 25/2214
2021/0061346 A1* 3/2021 Sato ........................ F16F 15/08

OTHER PUBLICATIONS

Written Opinion of the International Searching Authority dated Feb. 27, 2018 in International Application No. PCT/JP2017/044315.

* cited by examiner

POWER STEERING APPARATUS

TECHNICAL FIELD

The present invention relates to a power steering apparatus.

BACKGROUND ART

PTL 1 discloses a power steering apparatus configured to transmit a driving force of an electric motor to a ball screw mechanism via an input pulley, a belt, and an output pulley to convert it into an axial thrust force of a rack shaft. The output pulley is fastened to a nut of the ball screw mechanism with use of a screw.

CITATION LIST

Patent Literature

[PTL 1] Japanese Patent Application Public Disclosure No. 2014-184739

SUMMARY OF INVENTION

Technical Problem

The above-described conventional power steering apparatus has such a problem that the output pulley includes a portion where an axial cross-sectional area sharply changes within a portion that receives an axial force of the screw from a head portion of the screw, thereby leading to occurrence of stress concentration on this portion, resulting in an increase in a maximumly generated stress.

One of objects of the present invention is to provide a power steering apparatus capable of reducing the maximumly generated stress on the output pulley.

Solution to Problem

An output pulley of a power steering apparatus according to one aspect of the present invention includes a fastening target portion around a screw insertion hole of a hub portion. When a boundary portion between the hub portion and a winding and hanging portion is defined to be a portion where a minor angle, among relative angles formed between a tangential line of an inner surface of the output pulley and a rotational axis of a nut in an axial cross section of the output pulley that passes through the rotational axis of the nut, gradually reduces from a nut-rotational-axis side to a radially outer side to then reach 45 degrees, the fastening target portion is a region that is located on an inner side in a radial direction with respect to the boundary portion and overlaps a head portion of a screw in a radial direction of the screw.

Therefore, according to the one aspect of the present invention, the maximumly generated stress on the output pulley can be reduced.

DESCRIPTION OF EMBODIMENTS

First Embodiment

Figure 1:
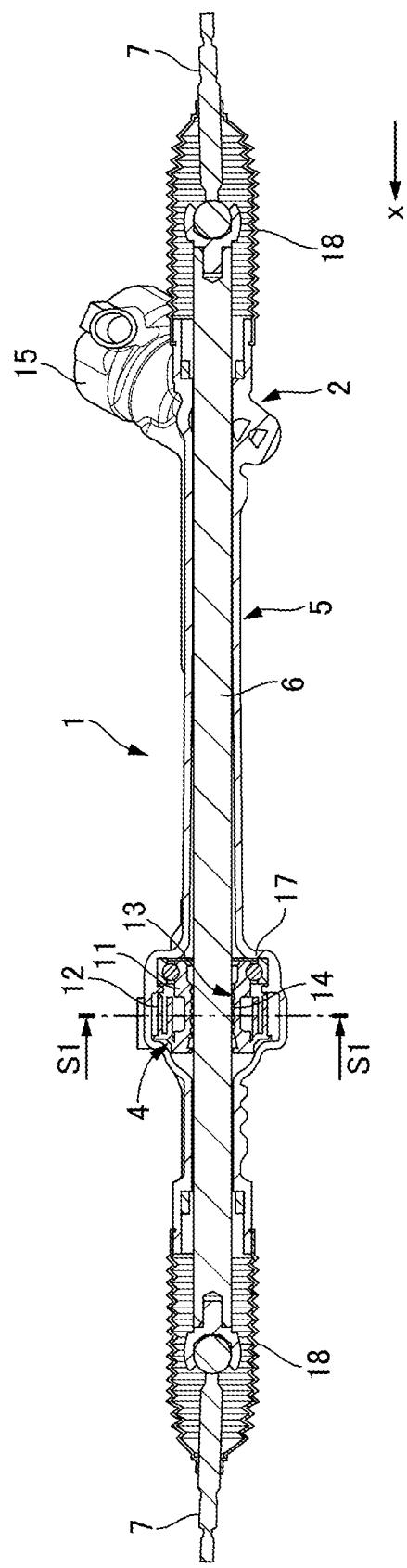
FIG. 1 is an axial cross-sectional view of a power steering apparatus 1 according to a first embodiment.
Figure 2:
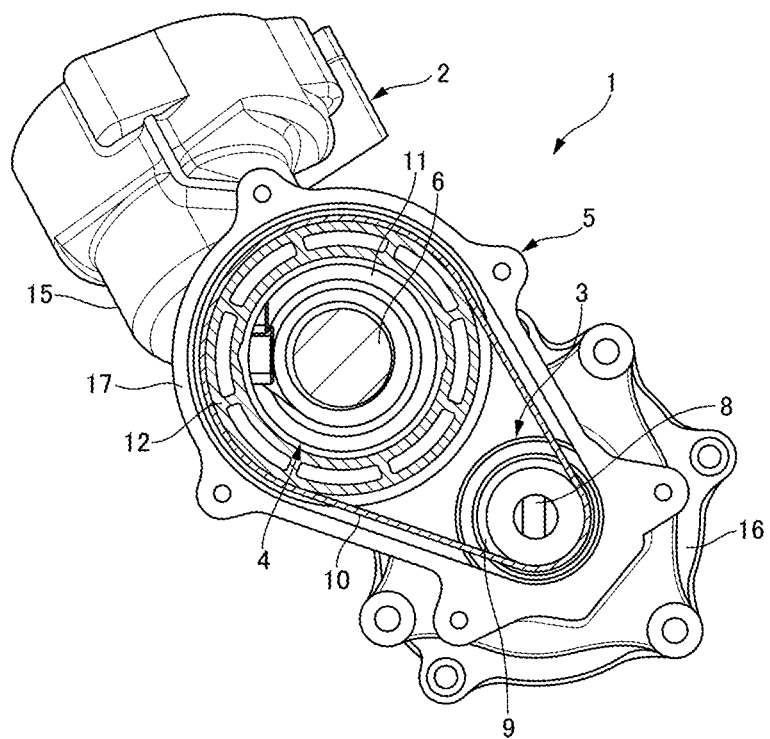
FIG. 2 is a cross-sectional view taken along a line indicated by arrows S1-S1 illustrated in FIG. 1.

FIG. 1 is an axial cross-sectional view of a power steering apparatus 1 according to a first embodiment, and FIG. 2 is a cross-sectional view taken along a line indicated by arrows S1-S1 illustrated in FIG. 1.

The electric power steering apparatus 1 is mounted on a vehicle that uses an engine as a power source thereof. The power steering apparatus 1 includes a steering mechanism 2, an electric motor 3, a ball screw mechanism 4, and a housing 5.

The steering mechanism 2 turns front wheels, which are turning target wheels. The steering mechanism 2 includes a rack bar (a wheel turning shaft) 6 extending in a vehicle width direction. The rack bar 6 is formed with use of a ferrous metallic material, such as a steel material. The rack bar 6 moves in the vehicle width direction according to a rotation of a steering shaft connected to a not-illustrated steering wheel. End portions of a pair of tie rods 7 and 7 are connected to both ends of the rack bar 6, respectively. The front wheels are connected to the pair of tie rods 7 and 7.

The electric motor 3 provides a steering force to the steering mechanism 2. The electric motor 3 is, for example, a three-phase brushless motor. An output of the electric motor 3 is controlled by a not-illustrated motor control unit according to a driver's steering torque input to the not-illustrated steering wheel and a vehicle speed. An input pulley 9 is attached to a motor shaft 8 of the electric motor 3. One end side of a belt (a transmission member) 10 is wound and hung on an outer periphery of the input pulley 9.

The ball screw mechanism 4 is provided between the steering mechanism 2 and the electric motor 3. The ball screw mechanism 4 converts a rotational force of the electric motor 3 into a thrust force of the steering mechanism 2. The ball screw mechanism 4 includes a nut 11. The nut 11 is formed generally cylindrically so as to surround the rack bar 6. An output pulley 12 is fixed at an outer periphery of the nut 11. A rotational axis of the output pulley 12 coincides with a rotational axis of the nut 11. The rotational axes of the nut 11 and the output pulley 12 are disposed offset in a radial direction of the input pulley 9 from a rotational axis of the input pulley 9. An outer diameter of the output pulley 12 is larger than an outer diameter of the input pulley 9. The other end of the belt 10 is wound and hung on an outer periphery of the output pulley 12. The nut 11 is supported so as to be able to rotate but unable to axially move relative to the housing 5. A ball circulation groove 13 is formed on an inner periphery of the nut 11 and an outer periphery of the rack bar 6. A plurality of balls 14 is loaded in the ball circulation groove 13. Each of the balls 14 moves to one end side or the other end side of the ball circulation groove 13 according to a rotation of the nut 11. The balls 14 after reaching the one end or the other end of the ball circulation groove 13 due to the rotation of the nut 11 are returned to the other end or the one end of the ball circulation groove 13 via a tube (refer to FIG. 3) 4a, which is a circulation mechanism.

The housing 5 is formed by die casting with use of an aluminum alloy. The housing 5 includes a steering mechanism housing 15, a motor housing 16, and a ball screw mechanism housing 17. The steering mechanism housing 15 contains a part of the steering mechanism 2 (a part of the steering shaft, the rack bar 6, and the like) therein. Inner ends of dust boots 18 in the vehicle width direction are fixed to both ends of the steering mechanism housing 15 in the vehicle width direction, respectively. The dust boots 18 are each formed into a bellows-like annular shape with use of rubber or the like. Outer ends of the dust boots 18 in the vehicle width direction are fixed to the tie rods 7, respectively. The motor housing 16 contains the electric motor 3 therein. The ball screw mechanism housing 17 contains the ball screw mechanism 4 therein.

Next, the nut 11 and the output pulley 12 according to the first embodiment will be described in detail. In FIG. 1, an X axis is set along an axial direction of the rack bar 6. Then, an X axis positive direction is defined to be a direction extending from the steering mechanism 2 side toward the ball screw mechanism 4 side, and a radial direction and a circumferential direction are defined to be a direction perpendicular to the X axis and a direction around the X axis, respectively.

Figure 3:
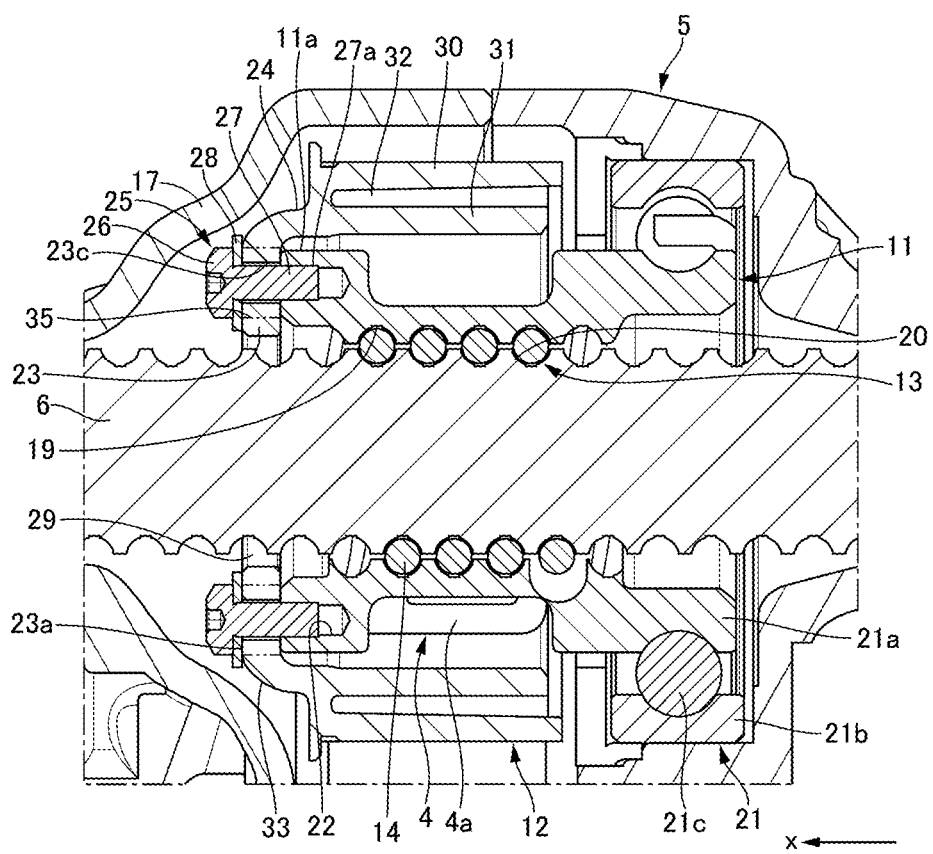
FIG. 3 is an axial cross-sectional view of a ball screw mechanism 4 that passes through a rotational axis of the nut 11.

FIG. 3 is an axial cross-sectional view of the ball screw mechanism 4 that passes through the rotational axis of the nut 11.

The nut 11 is formed so as to have a smaller diameter at a central portion thereof in the X-axis direction than at both ends thereof in the X-axis direction. A helical nut-side ball screw groove 19 is formed on the inner periphery of the nut 11 at the central portion thereof in the X-axis direction. On the other hand, a helical rack bar-side ball screw groove (a turning target wheel-side ball screw groove) 20 is formed on the outer periphery of the rack bar 6. The ball circulation groove 13 is formed by the nut-side ball screw groove 19 and the rack bar-side ball screw groove 20. An inner race 21a of a ball bearing 21 is integrally formed on an end of the nut 11 in the X axis negative direction. The ball bearing 21 supports the nut 11 circumferentially rotatably relative to the ball screw mechanism housing 17. The ball bearing 21 includes the inner race 21a, an outer race 21b, and a ball 21c. The outer race 21b is fixed to the ball screw mechanism housing 17. The ball 21c is disposed between the inner race 21a and the outer race 21b. Four female screw portions 22 are formed at an end of the nut 11 in the X-axis positive direction. The female screw portions 22 extend along the X-axis direction. Each of the female screw portions 22 is disposed at an interval of 90 degrees in the circumferential direction.

Figure 4:
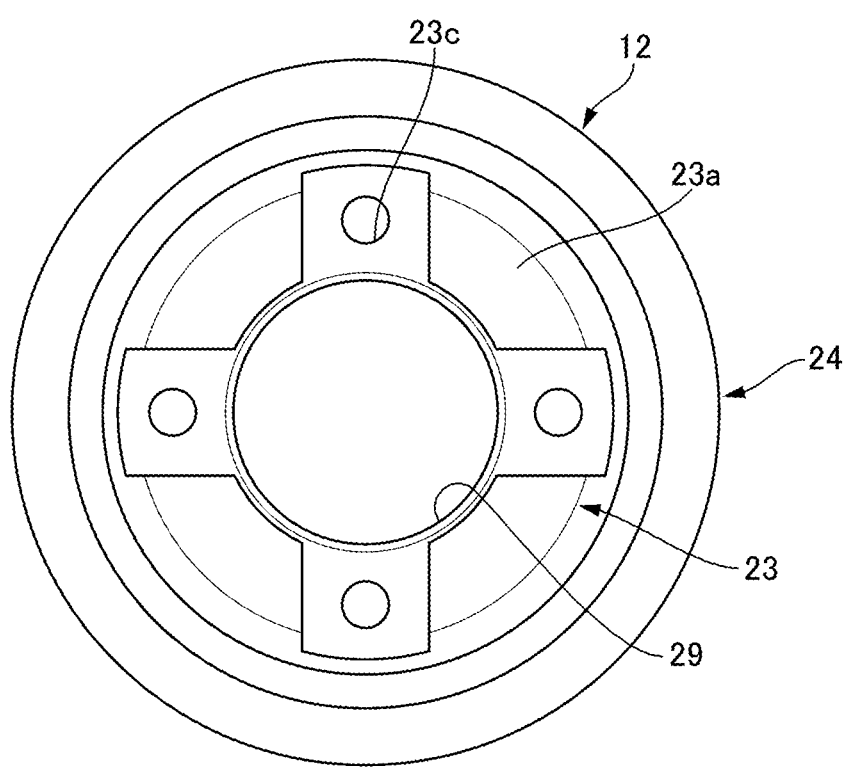
FIG. 4 is a front view of an output pulley 12.
Figure 5:
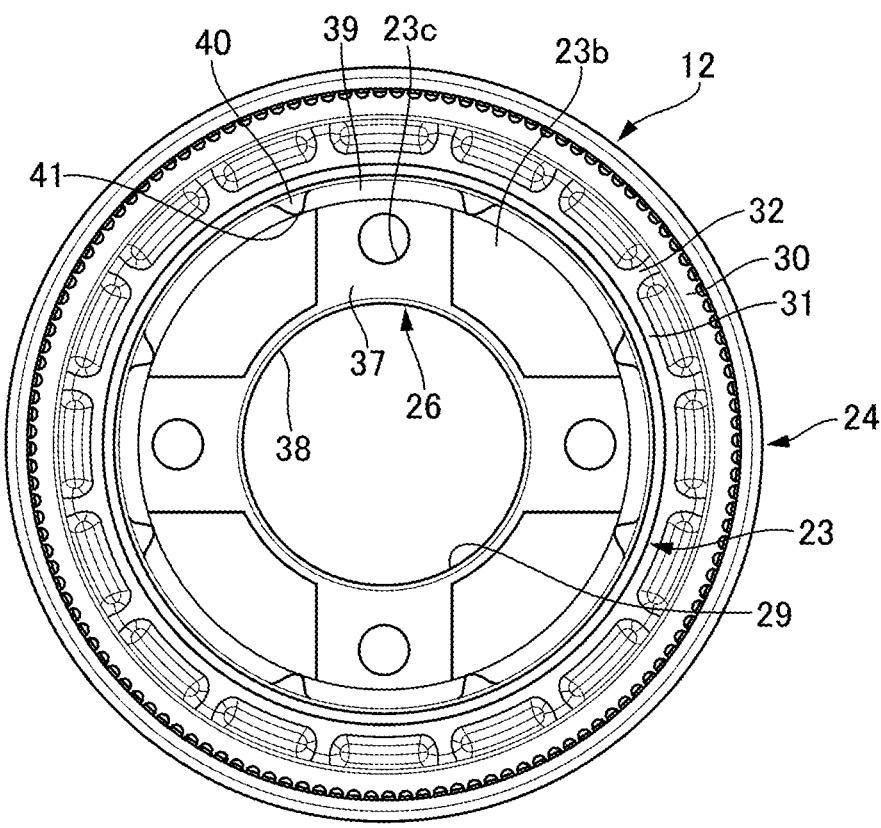
FIG. 5 is a rear view of the output pulley 12.
Figure 6:
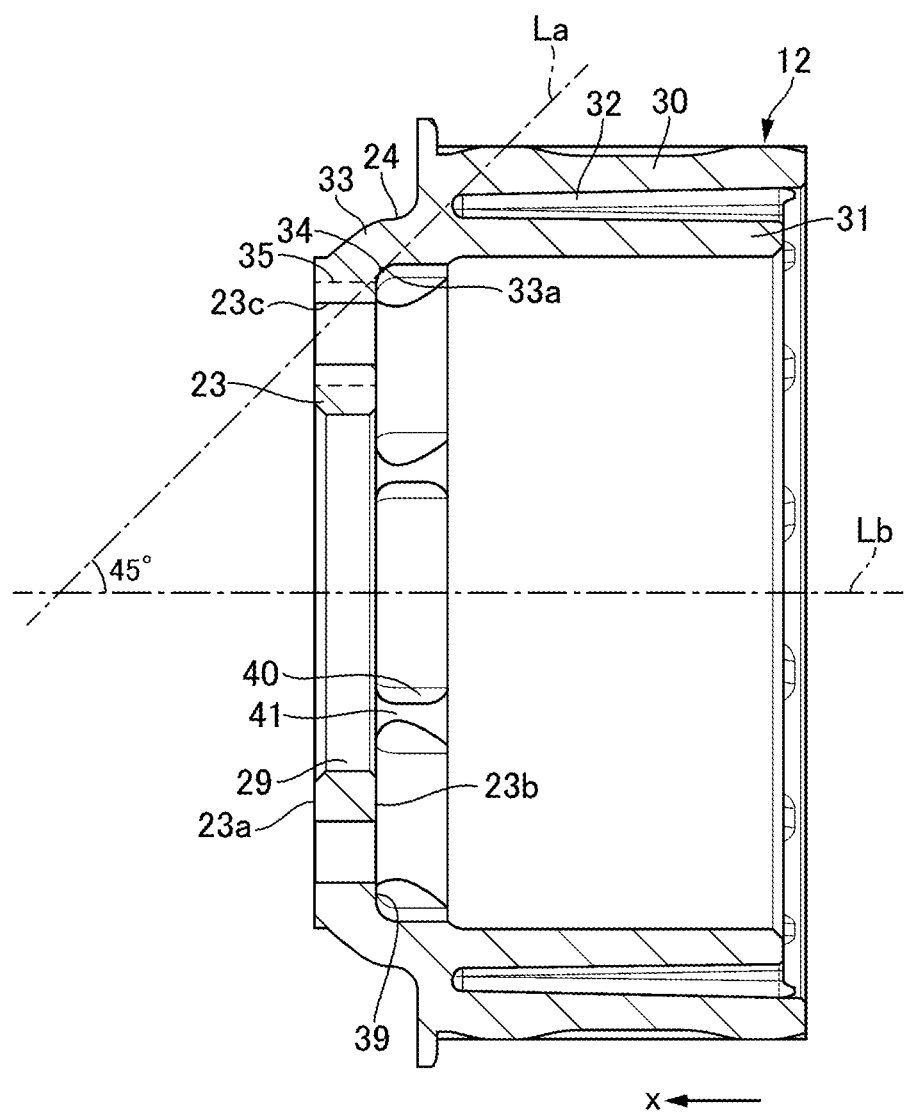
FIG. 6 is an axial cross-sectional view of the output pulley 12 that passes through the rotational axis of the nut 11.

FIG. 4 is a front view of the output pulley 12. FIG. 5 is a rear view of the output pulley 12. FIG. 6 is an axial cross-sectional view of the output pulley 12 that passes through the rotational axis of the nut 11.

The output pulley 12 is formed into a bottomed cup-like shape by injection molding with use of a resin material. In the first embodiment, a disk gate (a diaphragm gate) type is employed as a gate at the time of the injection molding. The output pulley 12 includes a hub portion 23 and a winding and hanging portion 24. The hub portion 23 is located at an end of the output pulley 12 in the X-axis positive direction. The hub portion 23 is formed into a generally annular disk-like shape. Four screw insertion holes 23c penetrate through the hub portion 23 in the X-axis direction. Each of the screw insertion holes 23c is disposed at an interval of 90 degrees in the circumferential direction. A screw 25 is inserted through each of the screw insertion holes 23c from the X-axis positive direction side. The screw 25 fastens the output pulley 12 and the nut 11 to each other. The screw 25 includes a head portion 26 and a shaft portion 27. An outer shape of the head portion 26 is generally circular when being viewed from the X-axis direction. A male screw portion (a screw groove of a male screw) 27a is formed on the shaft portion 27. The male screw portion 27a is fitted in the female screw portion 22 of the nut 11 due to a screw effect. A washer 28 is disposed between the screw 25 and an outer surface (a surface on the X-axis positive direction side) 23a of the hub portion 23. The washer 28 is formed into an annular disk-like shape. An outer diameter of the washer 28 is larger than an outer diameter of the head portion 26. The hub portion 23 includes a rack bar insertion hole (a wheel turning shaft insertion hole) 29 at a radial center thereof. The rack bar 6 penetrates through the rack bar insertion hole 29.

The winding and hanging portion 24 extends from an outer periphery of the hub portion 23 in the X-axis negative direction. The winding and hanging portion 24 includes an outer cylindrical portion 30, an inner cylindrical portion 31, and sixteen bridge portions 32. The outer cylindrical portion 30 is cylindrically formed. The belt 10 is wound and hung on the outer cylindrical portion 30. The inner cylindrical portion 31 is located on a radially inner side of the outer cylindrical portion 30. The inner cylindrical portion 31 is formed into a cylindrical shape smaller in diameter than the outer cylindrical portion 30. An end of the outer cylindrical portion 30 in the X-axis positive direction is connected to the inner cylindrical portion 31. The bridge portions 32 extend radially between the outer cylindrical portion 30 and the inner cylindrical portion 31, and connect the outer cylindrical portion 30 and the inner cylindrical portion 31 to each other. Each of the bridge portions 32 is disposed at an interval of 22.5 degrees in the circumferential direction.

The winding and hanging portion 24 and the hub portion 23 are smoothly connected to each other via a connection portion 33. The connection portion 33 is formed into a circular-arc shape in an axial cross section of the output pulley 12 that passes through the rotational axis of the nut 11. Now, referring to FIG. 6, a boundary portion 34 between the hub portion 23 and the winding and hanging portion 24 is defined to be a portion where a minor angle among angles (relative angles) formed between a tangential line La of an inner surface 33a of the connection portion 33 and a rotational axis Lb of the nut 11 gradually reduces from the rotational axis Lb toward a radially outer side to then reach 45 degrees. Further, a fastening target portion 35 is defined to be a region that is around the screw insertion hole 23c of the hub portion 23 and radially overlaps the head portion 26 of the screw 25. The fastening target portion 35 is a portion that receives an axial force of the screw 25 from the head portion 26 of the screw 25 when the output pulley 12 and the nut 11 are fastened to each other with use of the screw 25. The fastening target portion 35 is located on a radially inner side with respect to the boundary portion 34. An outer peripheral edge of the washer 28 radially overlaps the boundary portion 34.

The hub portion 23 of the output pulley 12 includes a protrusion portion 36 on an inner surface (a surface on the X-axis negative direction side) 23b thereof. The protrusion portion 36 protrudes from the inner surface 23b in the X-axis negative direction by a predetermined length. The protrusion portion 36 includes four radial protrusion portions 37 and an annular protrusion portion 38. Each of the radial protrusion portions 37 is disposed at an interval of 90 degrees in the circumferential direction in conformity with the position of the screw insertion hole 23c. Each of the radial protrusion portions 37 is generally in coplanar abutment with the end of the nut 11 in the X-axis positive direction. The radial protrusion portion 37 has a shape that extends radially and entirely contains a projection area of the fastening target portion 35 when being viewed from the X-axis direction. The annular protrusion portion 38 is disposed at an opening edge of the rack bar insertion hole 29. The annular protrusion portion 38 is connected to a radially inner end of each of the radial protrusion portions 37.

The hub portion 23 includes four thinned portions 39 and eight thickened portions 40 on the inner surface 23b thereof. Each of the thinned portions 39 is a predetermined region portion on a radially outer side with respect to the screw insertion hole 23c of the radial protrusion portion 37. A width (a circumferential length) of the thinned portion 39 is wider than a width of the radial protrusion portion 37. Each of the thickened portions 40 is disposed at the same radial position as the thinned portion 39. The thickened portion 40 is located circumferentially adjacent to the thinned portion 39. The thickened portion 40 protrudes beyond the thinned portion 39, i.e., the radial protrusion portion 37 in the X-axis negative direction by a predetermined length. In other words, when a thickness is defined as a thickness of a material of the hub portion 23 in the X-axis direction, the thickness of the thickened portion 40 is greater than the thinned portion 39 (the radial protrusion portion 37).

Figure 7:
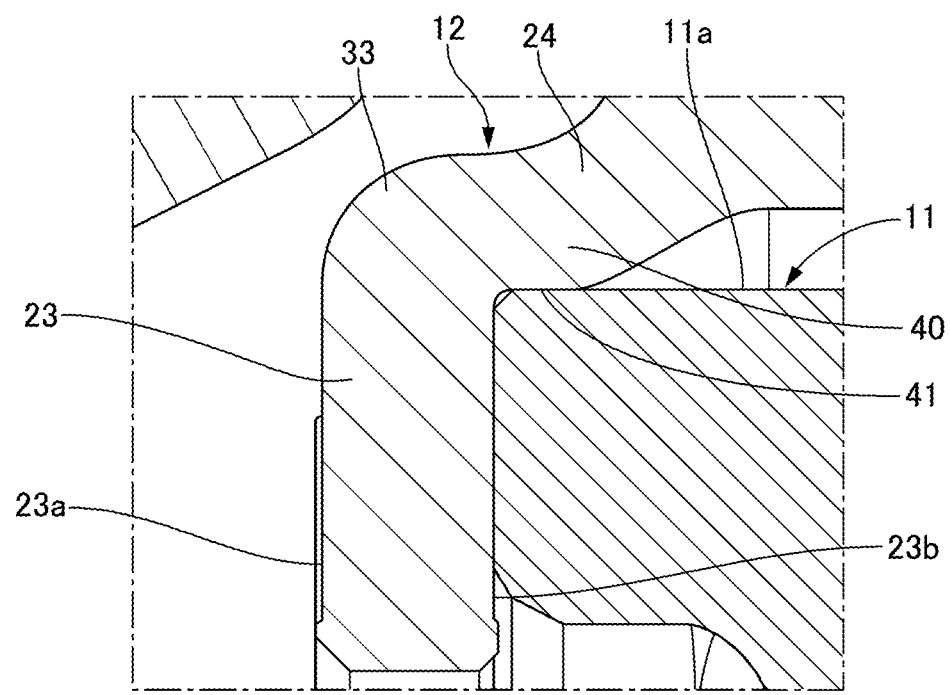
FIG. 7 is an axial cross-sectional view of main portions of the ball screw mechanism 4 that illustrates a state in which an end portion of the nut 11 in an X-axis positive direction is press-fitted inside each of centering portions 41.

Each of the thickened portions 40 includes a centering portion 41 on a radially inner side thereof. The centering portion 41 has a circular-arc shape convexed radially inward. As illustrated in FIG. 7, each of the centering portions 41 is in pressure contact with an outer peripheral surface 11a of the end portion of the nut 11 in the X-axis positive direction. In other words, the end portion of the nut 11 in the X-axis positive direction is press-fitted inside the centering portion 41.

Next, functions and effects of the power steering apparatus 1 according to the first embodiment will be described.

Figure 8:
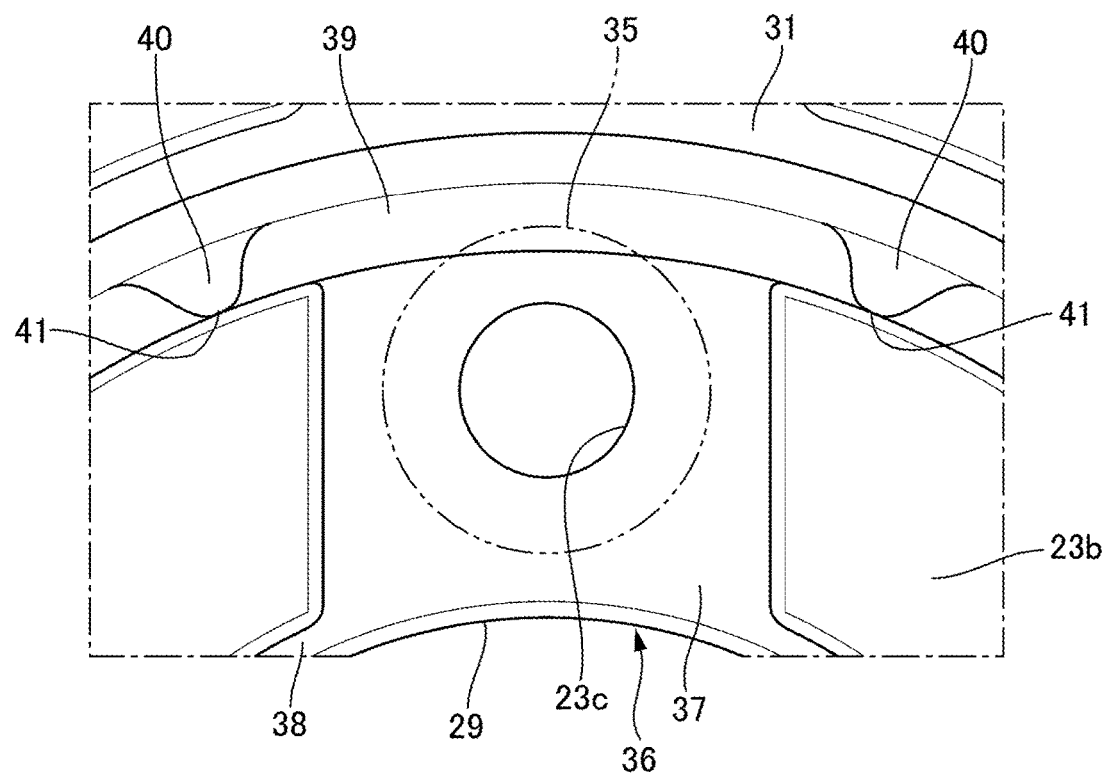
FIG. 8 is an enlarged view of main portions illustrated in FIG. 5.
Figure 9:
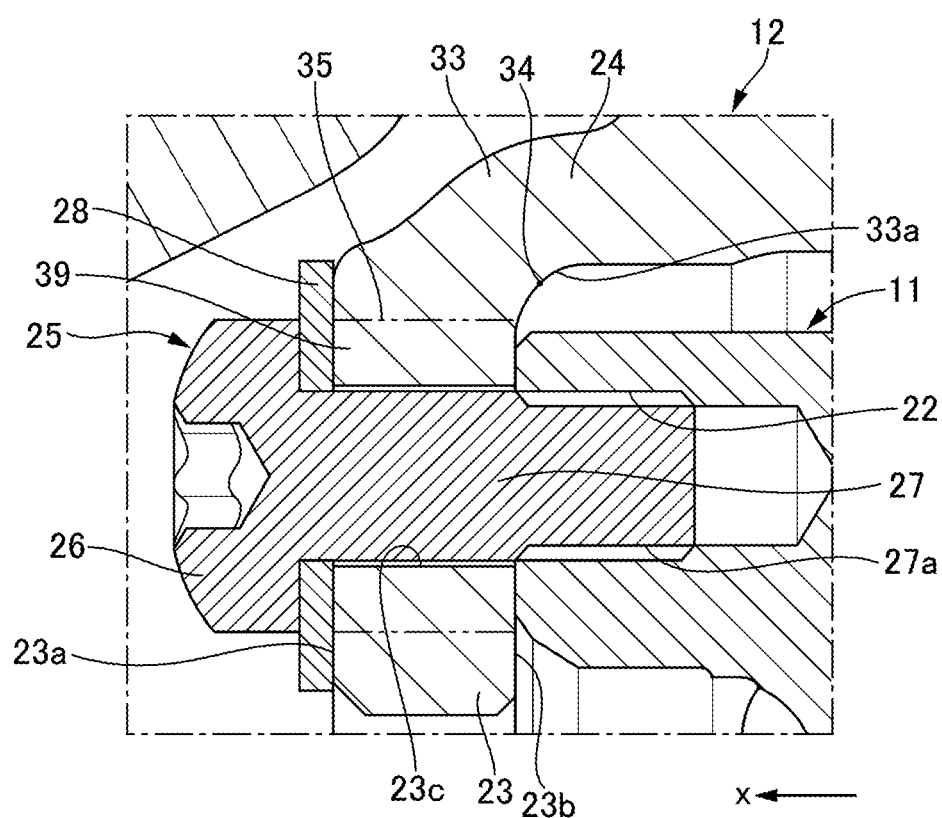
FIG. 9 is an enlarged view of main portions illustrated in FIG. 3.

FIG. 8 is an enlarged view of main portions illustrated in FIG. 5, and FIG. 9 is an enlarged view of main portions illustrated in FIG. 3.

When the nut 11 and the output pulley 12 are being fastened to each other with use of the screws 25, according to an increase in a fastening torque of each of the screws 25, a portion of the fastening target portion 35 of the output pulley 12 that is in abutment with the nut 11 (a portion sandwiched between the head portion 26 and the nut 11) is compressed and deformed while a portion that is not in abutment with the nut 11 (a portion not sandwiched between the head portion 26 and the nut 11) is bent and deformed in the X-axis negative direction. In the conventional output pulley, the boundary portion connecting the hub portion and the winding and hanging portion to each other radially overlaps the fastening target portion. The boundary portion is a portion where the axial cross-sectional area of the output pulley sharply changes, i.e., stiffness sharply changes. Therefore, the conventional output pulley leads to the generation of the stress concentration on the fastening target portion, thereby resulting in the increase in the maximumly generated stress on the fastening target portion. Now, the output pulley 12 according to the first embodiment is made from the resin material with the aim of, for example, reducing the weight and cutting down the cost. Because an allowable stress (a fatigue strength) of the resin output pulley is low compared to a metallic output pulley, the increase in the maximumly generated stress easily causes inconvenience in terms of the strength (a breakage due to a crack and a reduction in durability).

On the other hand, the output pulley 12 according to the first embodiment is configured in such a manner that the fastening target portion 35 is disposed on the radially inner side with respect to the boundary portion 34. In other words, the boundary portion 34 where the axial cross-sectional area sharply changes is shifted to the radially outer side with respect to the fastening target portion 35 that receives the axial force from the head portion 26 of the screw 25. This means that the fastening target portion 35 does not have the portion where the axial cross-sectional area sharply changes, and therefore the power steering apparatus 1 can distribute the stress generated due to the axial force of the screw 25, thereby easing the stress concentration. As a result, the power steering apparatus 1 can reduce the maximumly generated stress on the fastening target portion 35.

The output pulley 12 according to the first embodiment includes the thinned portion 39 in the predetermined region on the radially outer side of the screw insertion hole 23c, and has a smaller axial cross-sectional area of the thinned portion 39 than the axial cross-sectional area of the thickened portion 40 circumferentially adjacent to the thinned portion 39. Due to this configuration, the change in the axial cross-sectional area can be reduced in the region around the screw insertion hole 23c that significantly receives the axial force of the screw 25. Therefore, the power steering apparatus 1 can distribute the stress generated due to the axial force of the screw 25, thereby easing the stress concentration. As a result, the power steering apparatus 1 can reduce the maximumly generated stress on the fastening target portion 35.

The power steering apparatus 1 includes the washer 28 between the fastening target portion 35 and the head portion 26 of the screw 25. Due to this configuration, the power steering apparatus 1 can prevent the fastening target portion 35 made from the resin material from being damaged due to a contact with the head portion 26.

The outer peripheral edge of the washer 28 overlaps the boundary portion 34 in the radial direction of the screw 25. Due to the extension of an area over which the washer 28 contacts the hub portion 23, the power steering apparatus 1 can reduce the axial force (a surface pressure) per unit area that is applied from the washer 28 to the hub portion 23, thereby preventing or reducing deformation of the hub portion 23.

The output pulley 12 includes the centering portions 41 located on the radially inner side of the winding and hanging portion 24 and disposed in abutment with the outer peripheral surface 11a of the nut 11. When the nut 11 and the output pulley 12 are being fastened to each other with use of the screws 25, the abutment of the centering portions 41 with the outer peripheral surface 11a of the nut 11 allows the rotational axis of the output pulley 12 to approach the rotational axis of the nut 11 (an axis alignment effect). As a result, the power steering apparatus 1 can improve workability at the time of assembling, such as facilitating radial positional alignment between the screw insertion hole 23c and the female screw portion 22.

The centering portions 41 each have the circular-arc shape convexed inward in the radial direction of the output pulley 12. Because the abutment of a top of the circular arc with the outer peripheral surface 11a of the nut 11 allows them to contact each other at a portion shaped like a further linearized tangential line, the power steering apparatus 1 can eliminate or reduce an influence of molding accuracy of the contact surface. Further, the power steering apparatus 1 can minimize the contact area when the nut 11 is press-fitted to inside each of the centering portions 41, thereby reducing a press-fitting load and thus improving the workability at the time of the assembling.

The fastening target portion 35 includes the protrusion portion 36 protruding in the X-axis negative direction beyond the portion of the inner surface 23b of the hub portion 23 that is located adjacent to each of the fastening target portions 35. Now, the molding accuracy of the output pulley 12 affects assembling accuracy on the surface in abutment with the nut 11, but each of the fastening target portions 35 protrudes toward the nut 11 side beyond the adjacent other portion (the inner surface 23b), so that the power steering apparatus 1 can eliminate or reduce an influence of the molding accuracy of the other portion imposed on the surface in abutment with the nut 11. In other words, because the molding accuracy depends only on the molding accuracy of the protrusion portion 36, even if the other portion is pressed and a pressing impression remains when the output pulley 12 is extracted from the mold after the injection molding, this impression does not affect the assembling accuracy. Therefore, the power steering apparatus 1 can improve both the manufacturability and the assembling accuracy together.

The output pulley 12 includes the annular protrusion portion 38 surrounding the rack bar insertion hole 29 in which the rack bar 6 is inserted. Due to the annular protrusion portion 38, the power steering apparatus 1 can keep the axial cross-sectional area constant around the rack bar insertion hole 29, thereby keeping constant a degree of cooling shrinkage of the output pulley 12 around the rack bar insertion hole 29 during the course of the cooling shrinkage after the injection molding of the output pulley 12.

The winding and hanging portion 24 includes the cylindrically formed outer cylindrical portion 30 on which the belt 10 is wound and hung, the inner cylindrical portion 31 cylindrically formed and provided inside the outer cylindrical portion 30, and the bridge portions 32 extending in the radial direction of the nut 11 and connecting the outer cylindrical portion 30 and the inner cylindrical portion 31 to each other. It is preferable that the winding and hanging portion 24 has further higher cylindricity from the viewpoint of prevention or reduction of strange noise and prevention or reduction of a vibration when the output pulley 12 rotates. Then, hypothetically if the winding and hanging portion has a solid structure, an end portion of the winding and hanging portion opposite from the hub portion might be shrunk due to the cooling and be deflected radially inward when the output pulley is removed from a mold after the injection molding. On the other hand, the winding and hanging portion 24 according to the first embodiment can prevent or reduce the cooling shrinkage of the outer cylindrical portion 40 due to the bridge portions 32. Therefore, the cylindricity of the outer cylindrical portion 30 can be improved compared to when the winding and hanging portion has the solid structure.

The output pulley 12 is configured in such a manner that the region between the hub portion 23 and the winding and hanging portion 24 (the connection portion 33) is formed into the circular-arc shape in cross section along the axial direction of the output pulley 12 that passes through the rotational axis of the nut 11. In other words, smoothly connecting the hub portion 23 and the winding and hanging portion 24 via the circular-arc shaped connection portion 33 can allow the axial cross-sectional area to gradually change, thereby easing the stress concentration between the hub portion 23 and the winding and hanging portion 24.

The output pulley 12 is formed by the disk gate-type injection molding. The pin gate-type injection molding leads to generation of a weld line (a cold shut), thereby raising a concern about a reduction in stiffness due to a reduction in an adhesion strength on an interface. On the other hand, the disk gate-type injection molding unlikely leads to the generation of the weld line, thereby contributing to improving the stiffness of the output pulley 12 compared to the other type such as the pin gate.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

The transmission member may be a chain or the like.

The washer may be omitted between the fastening target portion and the head portion of the screw.

The centering portion and the thickened portion may be provided separately from each other.

In the following description, other configurations recognizable from the above-described embodiment will be described.

A power steering apparatus, in one configuration thereof, includes a wheel turning shaft configured to turn a turning target wheel by axially moving according to a rotation of a steering wheel; a nut provided annularly so as to surround the wheel turning shaft; a ball screw mechanism configured to move the wheel turning shaft with respect to the nut in a direction of a rotational axis of the nut and including a wheel turning shaft-side ball screw groove provided on an outer peripheral side of the wheel turning shaft and having a helically grooved shape, a nut-side ball screw groove provided on an inner peripheral side of the nut, having a helically grooved shape, and forming a ball circulation groove together with the wheel turning shaft-side ball screw groove, a plurality of balls provided in the ball circulation groove, and a circulation mechanism configured to circulate the plurality of balls from one end side to an opposite end side of the ball circulation groove; an output pulley including a hub portion provided so as to face a one-side end surface of the nut in the direction of the rotational axis of the nut and made from a resin material, a winding and hanging portion provided integrally with the hub portion and cylindrically formed from a resin material, and a screw insertion hole provided on the hub portion and penetrating in the direction of the rotational axis of the nut; a screw inserted in the screw insertion hole, including a head portion and a shaft portion where a screw groove of a male screw is formed, and fastening the nut and the output pulley to each other; an input pulley disposed offset in a radial direction with respect to the rotational axis of the nut; a transmission member provided so as to extend across between the output pulley and the input pulley and configured to transmit a rotation of the input pulley to the output pulley; and an electric motor configured to rotationally drive the input pulley. The output pulley includes a fastening target portion around the screw insertion hole of the hub portion. When a boundary portion between the hub portion and the winding and hanging portion is defined to be a portion where a minor angle, among relative angles formed between a tangential line of an inner surface of the output pulley and the rotational axis of the nut in an axial cross section of the output pulley that passes through the rotational axis of the nut, gradually reduces from a nut-rotational-axis side toward a radially outer side to then reach 45 degrees, the fastening target portion is a region that is located on an inner side in the radial direction with respect to the boundary portion and overlaps the head portion of the screw in a radial direction of the screw.

According to further preferable configuration, in the above-described configuration, the power steering apparatus further includes a washer between the fastening target portion and the head portion of the screw.

According to another preferable configuration, in any of the above-described configurations, the washer is provided in such a manner that an outer peripheral edge thereof overlaps the boundary portion in the radial direction of the screw.

According to further another preferable configuration, in any of the above-described configurations, the output pulley includes a centering portion provided inside the output pulley and disposed in abutment with an outer peripheral surface of the nut.

According to further another preferable configuration, in any of the above-described configurations, the centering portion has a circular-arc shape convexed inward in a radial direction of the output pulley.

According to further another preferable configuration, in any of the above-described configurations, the fastening target portion includes, on one side of the hub portion that faces the nut, a protrusion portion protruding toward a nut side beyond a portion located adjacent to the fastening target portion in the direction of the rotational axis of the nut.

According to further another preferable configuration, in any of the above-described configurations, the output pulley includes a wheel turning shaft insertion hole provided at the hub portion. The wheel turning shaft is inserted in the wheel turning shaft insertion hole. The protrusion portion includes an annular protrusion portion annularly formed so as to surround the wheel turning shaft insertion hole.

According to further another preferable configuration, in any of the above-described configurations, the winding and hanging portion includes a cylindrically formed outer cylindrical portion on which the transmission member is wound and hung, an inner cylindrical portion cylindrically formed and provided inside the outer cylindrical portion, and a bridge portion formed so as to extend in a radial direction of the nut and connecting the outer cylindrical portion and the inner cylindrical portion to each other.

According to further another preferable configuration, in any of the above-described configurations, the output pulley is configured in such a manner that a region between the hub portion and the winding and hanging portion is formed into a circular-arc shape in the axial cross section of the output pulley that passes through the rotational axis of the nut.

According to further another preferable configuration, in any of the above-described configurations, the output pulley is formed by disk gate-type injection molding.

Further, from another aspect, a power steering apparatus, in one configuration, includes a wheel turning shaft configured to turn a turning target wheel by axially moving according to a rotation of a steering wheel; a nut provided annularly so as to surround the wheel turning shaft; a ball screw mechanism configured to move the wheel turning shaft with respect to the nut in a direction of a rotational axis of the nut and including a wheel turning shaft-side ball screw groove provided on an outer peripheral side of the wheel turning shaft and having a helically grooved shape, a nut-side ball screw groove provided on an inner peripheral side of the nut, having a helically grooved shape, and forming a ball circulation groove together with the wheel turning shaft-side ball screw groove, a plurality of balls provided in the ball circulation groove, and a circulation mechanism configured to circulate the plurality of balls from one end side to an opposite end side of the ball circulation groove; an output pulley including a hub portion provided so as to face a one-side end surface of the nut in the direction of the rotational axis of the nut and made from a resin material, a winding and hanging portion provided integrally with the hub portion and cylindrically formed from a resin material, and a screw insertion hole provided on the hub portion and penetrating in the direction of the rotational axis of the nut; a screw inserted in the screw insertion hole, including a head portion and a shaft portion where a screw groove of a male screw is formed, and fastening the nut and the output pulley to each other; an input pulley disposed offset in a radial direction with respect to the rotational axis of the nut; a transmission member provided so as to extend across between the output pulley and the input pulley and configured to transmit a rotation of the input pulley to the output pulley; and an electric motor configured to rotationally drive the input pulley. When a thickness of the output pulley is defined to be a thickness of a material of the output pulley in the direction of the rotational axis of the nut, the output pulley includes a thinned portion provided in a predetermined region on an outer side of the screw insertion hole in a radial direction of the nut, and a thickened portion having a greater thickness than the thinned portion and provided in a region adjacent to the thinned portion in a direction around the rotational axis of the nut. A radius dimension, which is a distance from the rotational axis of the nut, at the thickened portion is the same as the radius dimension at the thinned portion.

Preferably, in the above-described configuration, the output pulley includes a centering portion provided inside the output pulley and disposed in abutment with an outer peripheral surface of the nut.

According to another preferable configuration, in any of the above-described configurations, the centering portion has a circular-arc shape convexed inward in a radial direction of the output pulley.

According to further another preferable configuration, in any of the above-described configurations, the output pulley includes a fastening target portion in a region that overlaps a head portion of the screw in a radial direction of the screw. The fastening target portion includes, on one side of the hub portion that faces the nut, a protrusion portion protruding toward a nut side beyond a portion located adjacent to the fastening target portion in the direction of the rotational axis of the nut.

According to further another preferable configuration, in any of the above-described configurations, the output pulley includes a wheel turning shaft insertion hole provided at the hub portion. The wheel turning shaft is inserted in the wheel turning shaft insertion hole. The protrusion portion includes an annular protrusion portion annularly formed so as to surround the wheel turning shaft insertion hole.

The present application claims priority to Japanese Patent Application No. 2017-2880 filed on Jan. 11, 2017. The entire disclosure of Japanese Patent Application No. 2017-2880 filed on Jan. 11, 2017 including the specification, the claims, the drawings, and the abstract is incorporated herein by reference in its entirety.

REFERENCE SIGN LIST 1 power steering apparatus
3 electric motor
4 ball screw mechanism
4a tube (circulation mechanism)
6 rack bar (wheel turning shaft)
9 input pulley
10 belt (transmission member)
11 nut
12 output pulley
13 ball circulation groove
14 ball
19 nut-side ball screw groove
20 rack bar-side ball screw groove (wheel turning shaft-side ball screw groove)
23 hub portion
23c screw insertion hole
24 winding and hanging portion
25 screw
26 head portion
27 shaft portion
27a male screw portion (screw groove of male screw)
28 washer
29 rack bar insertion hole (wheel turning shaft insertion hole)
30 outer cylindrical portion
31 inner cylindrical portion
32 bridge portion
34 boundary portion
35 fastening target portion
36 protrusion portion
38 annular protrusion portion
39 thinned portion
40 thickened portion
41 centering portion

The invention claimed is:

1. A power steering apparatus comprising:
a wheel turning shaft configured to turn a turning target wheel by axially moving according to a rotation of a steering wheel;
a nut provided annularly so as to surround the wheel turning shaft;
a ball screw mechanism configured to move the wheel turning shaft with respect to the nut in a direction of a rotational axis of the nut, the ball screw mechanism including a wheel turning shaft-side ball screw groove provided on an outer peripheral side of the wheel turning shaft and having a helically grooved shape, a nut-side ball screw groove provided on an inner peripheral side of the nut, having a helically grooved shape, and forming a ball circulation groove together with the wheel turning shaft-side ball screw groove, a plurality of balls provided in the ball circulation groove, and a circulation mechanism configured to circulate the plurality of balls from one end side to an opposite end side of the ball circulation groove;
an output pulley including a hub portion provided so as to face a one-side end surface of the nut in the direction of the rotational axis of the nut and made from a resin material, a winding and hanging portion provided integrally with the hub portion and cylindrically formed from a resin material, and a screw insertion hole provided on the hub portion and penetrating in the direction of the rotational axis of the nut;
a screw inserted in the screw insertion hole, the screw including a head portion and a shaft portion where a screw groove of a male screw is formed, the screw fastening the nut and the output pulley to each other;
an input pulley disposed offset in a radial direction with respect to the rotational axis of the nut;
a transmission member provided so as to extend across between the output pulley and the input pulley and configured to transmit a rotation of the input pulley to the output pulley; and
an electric motor configured to rotationally drive the input pulley,
wherein the output pulley includes a fastening target portion around the screw insertion hole of the hub portion, and
wherein, when a boundary portion between the hub portion and the winding and hanging portion is defined to be a portion where a minor angle, among relative angles formed between a tangential line of an inner surface of the output pulley and the rotational axis of the nut in an axial cross section of the output pulley that passes through the rotational axis of the nut, gradually reduces from a nut-rotational axis side toward a radially outer side to then reach 45 degrees, the fastening target portion is a region that is located on an inner side in the radial direction with respect to the boundary portion and overlaps the head portion of the screw in a radial direction of the screw.

2. The power steering apparatus according to claim 1, further comprising a washer between the fastening target portion and the head portion of the screw.

3. The power steering apparatus according to claim 2, wherein the washer is provided in such a manner that an outer peripheral edge thereof overlaps the boundary portion in the radial direction of the screw.

4. The power steering apparatus according to claim 1, wherein the output pulley includes a centering portion provided inside the output pulley and disposed in abutment with an outer peripheral surface of the nut.

5. The power steering apparatus according to claim 4, wherein the centering portion has a circular-arc shape convexed inward in a radial direction of the output pulley.

6. The power steering apparatus according to claim 1, wherein the fastening target portion includes, on one side of the hub portion that faces the nut, a protrusion portion protruding toward a nut side on which the nut is located beyond a portion located adjacent to the fastening target portion in the direction of the rotational axis of the nut.

7. The power steering apparatus according to claim 6, wherein the output pulley includes a wheel turning shaft insertion hole provided at the hub portion, the wheel turning shaft being inserted in the wheel turning shaft insertion hole, and
wherein the protrusion portion includes an annular protrusion portion annularly formed so as to surround the wheel turning shaft insertion hole.

8. The power steering apparatus according to claim 1, wherein the winding and hanging portion includes a cylindrically formed outer cylindrical portion on which the transmission member is wound and hung, an inner cylindrical portion cylindrically formed and provided inside the outer cylindrical portion, and a bridge portion formed so as to extend in the radial direction of the nut and connecting the outer cylindrical portion and the inner cylindrical portion to each other.

9. The power steering apparatus according to claim 1, wherein the output pulley is configured in such a manner that a region between the hub portion and the winding and hanging portion is formed into a circular-arc shape in the axial cross section of the output pulley that passes through the rotational axis of the nut.

10. The power steering apparatus according to claim 1, wherein the output pulley is formed by disk gate-type injection molding.

11. A power steering apparatus comprising:
a wheel turning shaft configured to turn a turning target wheel by axially moving according to a rotation of a steering wheel;
a nut provided annularly so as to surround the wheel turning shaft;
a ball screw mechanism configured to move the wheel turning shaft with respect to the nut in a direction of a rotational axis of the nut, the ball screw mechanism including a wheel turning shaft-side ball screw groove provided on an outer peripheral side of the wheel turning shaft and having a helically grooved shape, a nut-side ball screw groove provided on an inner peripheral side of the nut, having a helically grooved shape, and forming a ball circulation groove together with the wheel turning shaft-side ball screw groove, a plurality of balls provided in the ball circulation groove, and a circulation mechanism configured to circulate the plurality of balls from one end side to an opposite end side of the ball circulation groove;
an output pulley including a hub portion provided so as to face a one-side end surface of the nut in the direction of the rotational axis of the nut and made from a resin material, a winding and hanging portion provided integrally with the hub portion and cylindrically formed from a resin material, and a screw insertion hole provided on the hub portion and penetrating in the direction of the rotational axis of the nut;
a screw inserted in the screw insertion hole, the screw including a head portion and a shaft portion where a screw groove of a male screw is formed, the screw fastening the nut and the output pulley to each other;
an input pulley disposed offset in the radial direction with respect to the rotational axis of the nut;
a transmission member provided so as to extend across between the output pulley and the input pulley and configured to transmit a rotation of the input pulley to the output pulley; and
an electric motor configured to rotationally drive the input pulley,
wherein, when a thickness of the output pulley is defined to be a thickness of a material of the output pulley in the direction of the rotational axis of the nut, the output pulley includes a thinned portion provided in a predetermined region on an outer side of the screw insertion hole in a radial direction of the nut, and a thickened portion having a greater thickness than the thinned portion and provided in a region adjacent to the thinned portion in a direction around the rotational axis of the nut, and
wherein a radius dimension, which is a distance from the rotational axis of the nut, at the thickened portion is the same as the radius dimension at the thinned portion.

12. The power steering apparatus according to claim 11, wherein the output pulley includes a centering portion provided inside the output pulley and disposed in abutment with an outer peripheral surface of the nut.

13. The power steering apparatus according to claim 12, wherein the centering portion has a circular-arc shape convexed inward in a radial direction of the output pulley.

14. The power steering apparatus according to claim 11, wherein the output pulley includes a fastening target portion in a region that overlaps a head portion of the screw in a radial direction of the screw, and
wherein the fastening target portion includes, on one side of the hub portion that faces the nut, a protrusion portion protruding toward a nut side beyond a portion located adjacent to the fastening target portion in the direction of the rotational axis of the nut.

15. The power steering apparatus according to claim 14, wherein the output pulley includes a wheel turning shaft insertion hole provided at the hub portion, the wheel turning shaft being inserted in the wheel turning shaft insertion hole, and
wherein the protrusion portion includes an annular protrusion portion annularly formed so as to surround the wheel turning shaft insertion hole.

* * * * *